United States Patent
Von Ah et al.

(10) Patent No.: US 10,444,726 B2
(45) Date of Patent: Oct. 15, 2019

(54) I.S. MACHINE CONTROL UNIT

(71) Applicant: Emhart Glass S.A., Cham (CH)

(72) Inventors: Christian Von Ah, Zurich (CH); Inge Friberg, Sundsvall (SE); Eliseo Di Nitto, Albisola Sup. (IT)

(73) Assignee: Emhart Glass S.A., Cham (CH)

( * ) Notice: Subject to any disclaimer, the term of this patent is extended or adjusted under 35 U.S.C. 154(b) by 931 days.

(21) Appl. No.: 14/572,406

(22) Filed: Dec. 16, 2014

(65) Prior Publication Data

US 2016/0170399 A1 Jun. 16, 2016

(51) Int. Cl.
| | |
|---|---|
| G05B 19/10 | (2006.01) |
| C03B 9/16 | (2006.01) |
| C03B 9/41 | (2006.01) |

(52) U.S. Cl.
CPC ............ *G05B 19/102* (2013.01); *C03B 9/165* (2013.01); *C03B 9/41* (2013.01); *G05B 2219/2635* (2013.01)

(58) Field of Classification Search
CPC ......... C03B 9/165; C03B 9/41; G05B 19/102; G05B 2219/2635
See application file for complete search history.

(56) References Cited

U.S. PATENT DOCUMENTS

| | | | |
|---|---|---|---|
| 3,212,129 A * | 10/1965 | Craig | B29C 49/20 425/377 |
| 3,737,296 A | 6/1973 | Faure et al. | |
| 4,338,115 A * | 7/1982 | Farkas | C03B 9/41 65/158 |
| 4,369,052 A | 1/1983 | Hotmer | |
| 4,427,431 A * | 1/1984 | Mumford | C03B 9/165 65/158 |
| 4,641,269 A | 2/1987 | Japenga et al. | |
| 6,904,332 B2 | 6/2005 | Lingua et al. | |
| 2009/0078004 A1 | 3/2009 | Moriarty et al. | |
| 2013/0180286 A1 | 7/2013 | Miller et al. | |

OTHER PUBLICATIONS

Technical News Bulletin: "IS Machines Enhancements—Increased Safety Easier Operation." Aug. 1, 2012. Retrieved from the Internet: URL:httm;//old.emhartglass.com/files/TNB212%20P-Switch%20IS%Machines.pdf. Retrieved Sep. 13, 2016—entire document.
Johan Hedberg, "How to design safe machine control systems—a guideline to EN ISO 13849-1", 2011, 77 pages, SP Technical Research Institute of Sweden, Boras, Sweden.

* cited by examiner

*Primary Examiner* — Queenie S Dehghan
(74) *Attorney, Agent, or Firm* — Reinhart Boerner Van Deuren P.C.

(57) ABSTRACT

A control unit configured to control a section of an I.S. machine having a blank station including a first plurality of mechanisms and a blow station including a second plurality of mechanisms is provided. The control unit includes an operator interface configured to receive a first input and a second input from an operator. The control unit includes a controller configured to transition the section from a first mode of operation to a second mode of operation. Upon receipt of the first input the control unit is configured to supply power to either the first or second plurality of mechanisms and not to supply power to the other. The control is configured to move one of the mechanisms to which power is being supplied in the second mode of operation based on the second input received from the operator.

19 Claims, 7 Drawing Sheets

US 10,444,726 B2

I.S. MACHINE CONTROL UNIT

BACKGROUND OF THE INVENTION

Field of the Invention

The present invention relates generally to glass container forming machines and, more particularly, to control units for glass forming machines.

An individual section (I.S.) machine is configured to manufacture glass containers. An I.S. machine includes a plurality of sections. Each section has a blank station configured to form a gob of glass into a parison and a blow station configured to blow the parison into a glass container. Segments of molten glass, e.g., gobs, may be sheared from a stream of hot glass and located in blank molds where they are formed into parisons. The parisons are inverted and transferred to blow molds where the parisons are blown into finished glass containers. Timing and/or movement of the various mechanisms of the blank and blow stations, e.g., blank mold halves, blow mold halves, etc., is controlled by a control unit.

SUMMARY OF THE INVENTION

One aspect of the invention relates to a control unit configured to control a section of an I.S. machine having a blank station including a first plurality of mechanisms and a blow station including a second plurality of mechanisms. The control unit includes an operator interface configured to receive a first input and a second input from an operator. The control unit includes a controller. The controller is configured to transition the section from a first mode of operation to a second mode of operation upon receipt of the first input. Upon receipt of the first input, the control unit is configured to supply power to either the first plurality of mechanisms or the second plurality of mechanisms and to not supply power to the other plurality of mechanisms. The controller is configured to move one of the plurality of mechanisms to which power is being supplied in the second mode of operation based on the second input received from the operator.

Another aspect of the invention relates to an I.S. machine configured to form glass containers. The I.S. machine includes a blank station. The blank station includes a first plurality of mechanisms configured to form glass gobs into parisons. The I.S. machine includes a blow station. The blow station includes a second plurality of mechanisms configured to form the parisons into the glass containers. The I.S. machine includes an invert mechanism. The invert mechanism is configured to move the parisons from the blank station to the blow station. The I.S. machine includes a controller. The controller is configured to receive a first input from an operator through an operator interface. The controller is configured to operate the blank station, the blow station, and the invert mechanism to form glass containers. The controller is configured to provide power to either the blank station or the blow station and to not supply power to the other station upon receipt of the input from the operator.

Another aspect of the invention relates to a method of adjusting a mechanism of an I.S. machine having a blank station including a plurality of parison-forming mechanisms and a blow station including a plurality of glass container-forming mechanisms. The method includes supplying power to the parison-forming mechanisms of the blank station while not supplying power to the glass container-forming mechanisms of the blow station. The method includes adjusting one of the parison-forming mechanisms of the blank station. The method includes supplying power to the glass container-forming mechanisms of the blow station while not supplying power to the parison-forming mechanisms of the blank station. The method includes adjusting one of the glass container-forming mechanisms of the blow station.

Alternative exemplary embodiments relate to other features and combinations of features as may be generally recited in the claims.

DESCRIPTION OF THE DRAWINGS

This application will become more fully understood from the following detailed description, taken in conjunction with the accompanying figures wherein like reference numerals refer to like elements in which.

While the invention will be described in connection with certain preferred embodiments, there is no intent to limit it to those embodiments. On the contrary, the intent is to cover all alternatives, modifications, and equivalents as included within the spirit and scope of the invention as defined by the appended claims.

DETAILED DESCRIPTION OF THE EXEMPLARY EMBODIMENTS

Referring to the Figures generally, a control unit for controlling an I.S. machine is provided. At various times it may be desirable to move, reconfigure, adjust, etc., individual mechanisms of a section of the I.S. machine, e.g., mold halves, blow heads, neck rings, baffles, etc. An operator of the I.S. machine may adjust movement and/or location and/or timing of various mechanisms of blank station and/or the blow station of a section of the I.S. machine. In some embodiments of I.S. machines, it may be difficult for an operator at a blank station to see another operator at the blow station and vice versa. To ensure safety of an operator at the blow station, it may be desirable to not provide power to, e.g., disconnect from power, the mechanisms of the blow station when an operator at the blank station is adjusting mechanisms of the blank station, e.g., to prevent accidental movement of a mechanism of the blow station. However, it may also be desirable to maintain power to the blank station mechanisms while disconnecting the blow station mechanisms from power, e.g., to allow an operator to move, adjust, configure, jog, etc., the individual mechanisms of the blank station. Likewise, to ensure safety of an operator at the blank station, it may be desirable to not provide power to, e.g., disconnect from power, the mechanisms of the blank station when an operator at the blow station is adjusting mechanisms of the blow station, e.g., to prevent accidental movement of a mechanism of the blank station. However, it may also be desirable to maintain power to the blow station mechanisms while disconnecting the blank station mechanisms from power, e.g., to allow an operator to move, adjust, configure, jog, etc., the individual mechanisms of the blow station.

Figure 1:
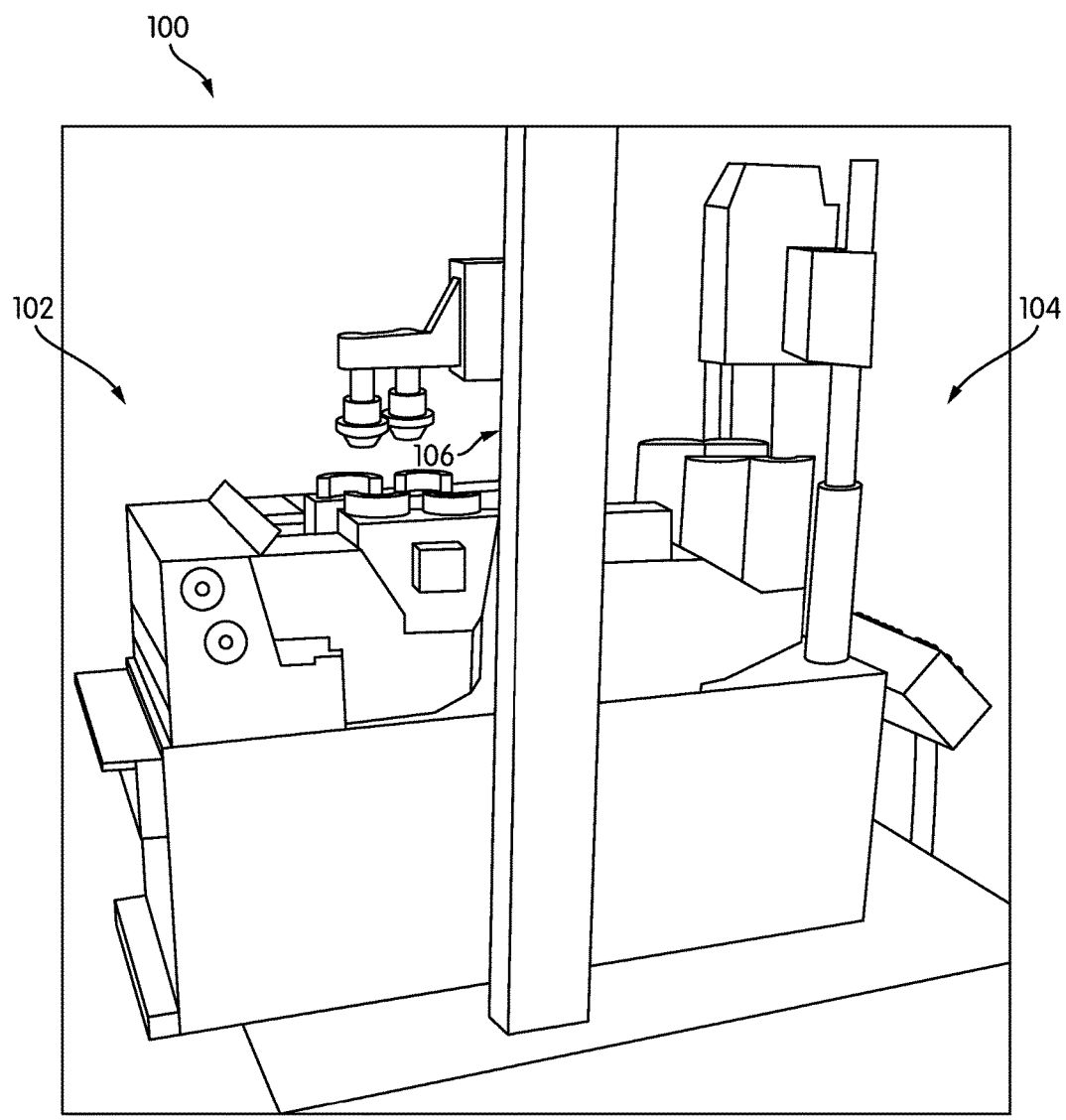
FIG. 1 is a view of a section of an I.S. machine shown schematically according to an exemplary embodiment.

With reference to FIG. 1, an embodiment of a section 100 of an I.S. machine is provided. The section 100 includes a blank station 102 and a blow station 104. The section 100 also include an invert mechanism 106 configured to invert and move parisons formed in the blank station 102 to the blow station 104.

Figure 2:
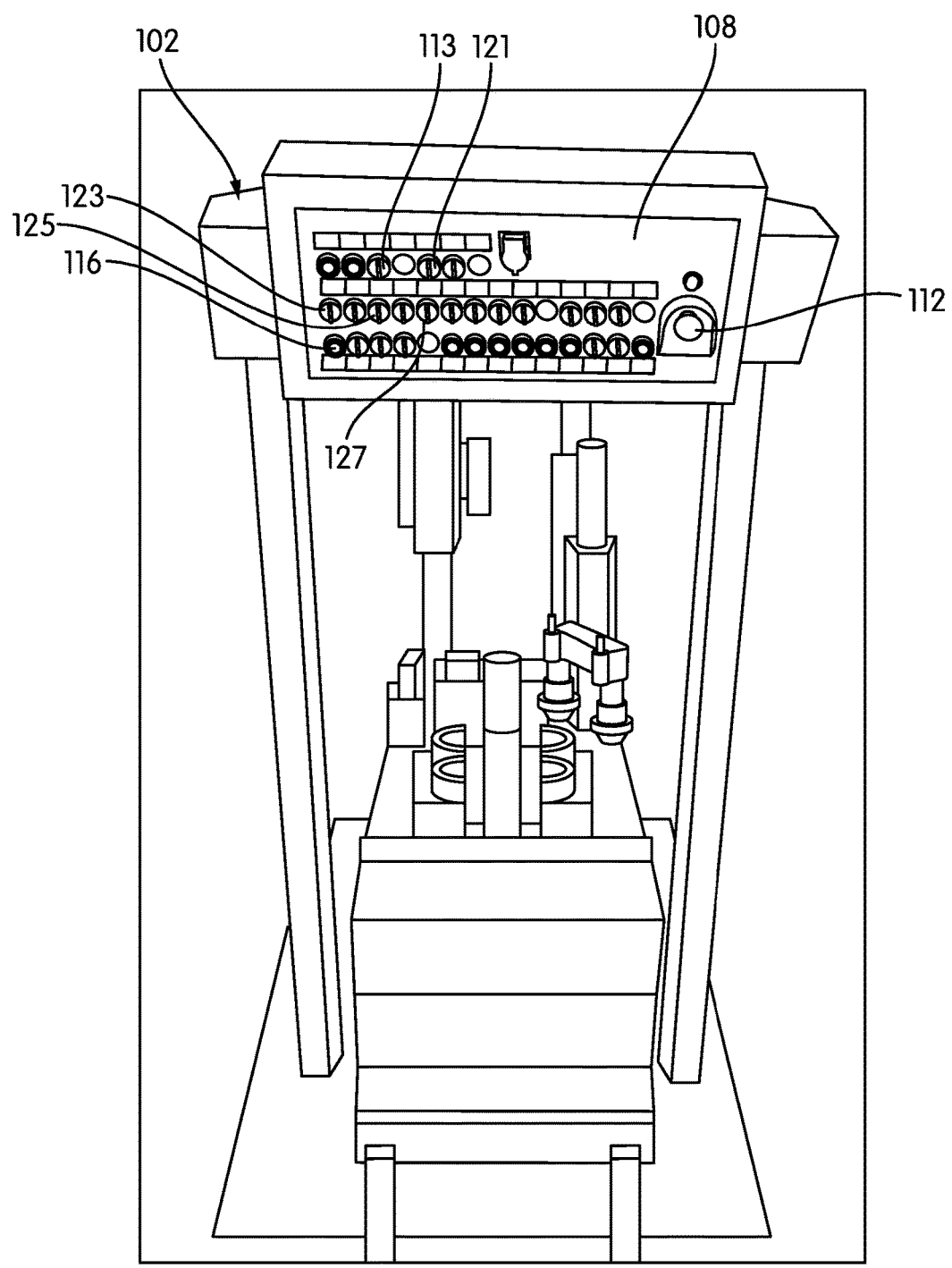
FIG. 2 is a view of a blank station of a section of the I.S. machine of FIG. 1 shown schematically according to an exemplary embodiment.

With reference to FIG. 2, an embodiment of a blank station 102 is illustrated. The blank station 102 includes an operator interface, shown as blank station control panel 108, configured to receive input from an operator to control movement and/or adjustment of mechanisms of the blank station 102, e.g., parison-forming mechanisms, servo mechanisms, pneumatic mechanisms, mold halves, baffles, etc., and, in one embodiment, the invert mechanism 106. In one embodiment, the blank station control panel 108 includes a plurality of buttons and/or switches that may be actuated by an operator to provide input to a control unit configured to control movement of the mechanisms of the section 100. The blank station control panel 108 includes a maintenance mode initiator, shown as maintenance mode button 112. When the maintenance mode button 112 is actuated, the control unit is configured to not provide power to, e.g., remove power from, all of the mechanisms of the blank station 102, the blow station 104, and the invert mechanism 106. The blank station control panel 108 also includes a setup mode initiator, shown as setup mode button 113.

In one embodiment, upon actuation of the setup mode button 113, the control unit is configured to transition the section 100 between a first mode of operation (e.g., a mode in which the section is making glass containers, not setup mode, etc.) and a second mode of operation in which power is provided to the mechanisms of the blank station 102 and the invert mechanism 106 and power is not provided to, e.g., power is cut off from, the mechanisms of the blow station 104. The blank station control panel 108 also includes a first operator input mechanism, shown as enable button 116, and a second operator input mechanism, shown as a plurality of movement adjustment switches and/or buttons 121, 123, 125, 127 each configured to adjust movement, e.g., location adjustment, etc., of a different blank station 102 mechanism (e.g., servo mechanism, pneumatic mechanism, etc.) (other movement adjustment switches and/or buttons configured to adjust movement, e.g., location adjustment, etc., of other blank station 102 mechanisms are shown without reference numbers). The control unit is configured to continue to provide power to blank station 102 mechanisms when the enable button 116 is actuated, while continuing to maintain the blow station 104 disconnected from power.

In one embodiment, the enable button 116 is biased toward a first, unactuated configuration, e.g., once the operator stops pressing the enable button 116, it returns to the first configuration. The operator, while pressing the enable button 116, may actuate one of the movement adjustment switches and/or buttons 121, 123, 125, 127, e.g., with one hand actuating, e.g., pressing, the enable button 116 and the other hand actuating the movement adjustment switch and/or button. When both the enable button 116 and one of the movement adjustment switches and/or buttons are actuated simultaneously in setup mode, the control unit is configured to move, adjust, configure, jog, etc., the mechanism associated with the actuated movement adjustment switch and/or button. Thus, this two-handed control may prevent an operator from reaching into the blank station 102 while mechanisms of the blank station 102 are being moved. In one embodiment, the movement adjustment switches and/or buttons 121, 123, 125, 127 cannot be actuated unless the enable button 116 is also being actuated. In another embodiment, actuation of the movement adjustment switches and/or buttons 121, 123, 125, 127 while the enable button 116 is not also actuated will not cause movement of the mechanism controlled by the actuated movement adjustment switch and/or button.

In one embodiment, the control unit also includes a speed supervision controller, as will be further described below. When the setup mode button 113 is actuated and the section 100 is in setup mode, the speed supervision controller is configured to monitor and/or control the speed of movement of the invert mechanism 106. If the speed of movement of the invert mechanism exceeds a predetermined speed, the speed supervision controller is configured to stop movement of the invert mechanism 106 and/or to stop supplying power to the invert mechanism 106, e.g., disconnect power from the invert mechanism 106.

In one embodiment, the movement adjustment switch and/or button 121 is configured to control movement of the invert mechanism 106 in setup mode. In one embodiment, the movement adjustment switch and/or button 123 is configured to control movement of the blank molds, e.g., blank mold halves. In one embodiment, the movement adjustment switch and/or button 125 is configured to control movement of the baffle mechanism. In one embodiment, the movement adjustment switch and/or button 127 is configured to control movement of the funnel mechanism.

In another embodiment, when the setup mode button 113 is actuated, power is not supplied to mechanisms of either the blank station 102 or the blow station 104, e.g., the mechanisms of both the blank station 102 and the blow station 104 are disconnected from power. Then, when the enable button 116 is actuated, power is supplied to the blank station 102, but not to the blow station 104, and when a movement adjustment switch and/or button 121, 123, 125, 127 is actuated while the enable button 116 is actuated, the mechanism controlled by the selected movement adjustment switch and/or button is moved. In one embodiment, the enable button 116 is biased toward a first, unactuated configuration, and, thus, power is only provided to the blank station 102 mechanisms in setup mode while the operator continues to press the enable button 116.

Figure 3:
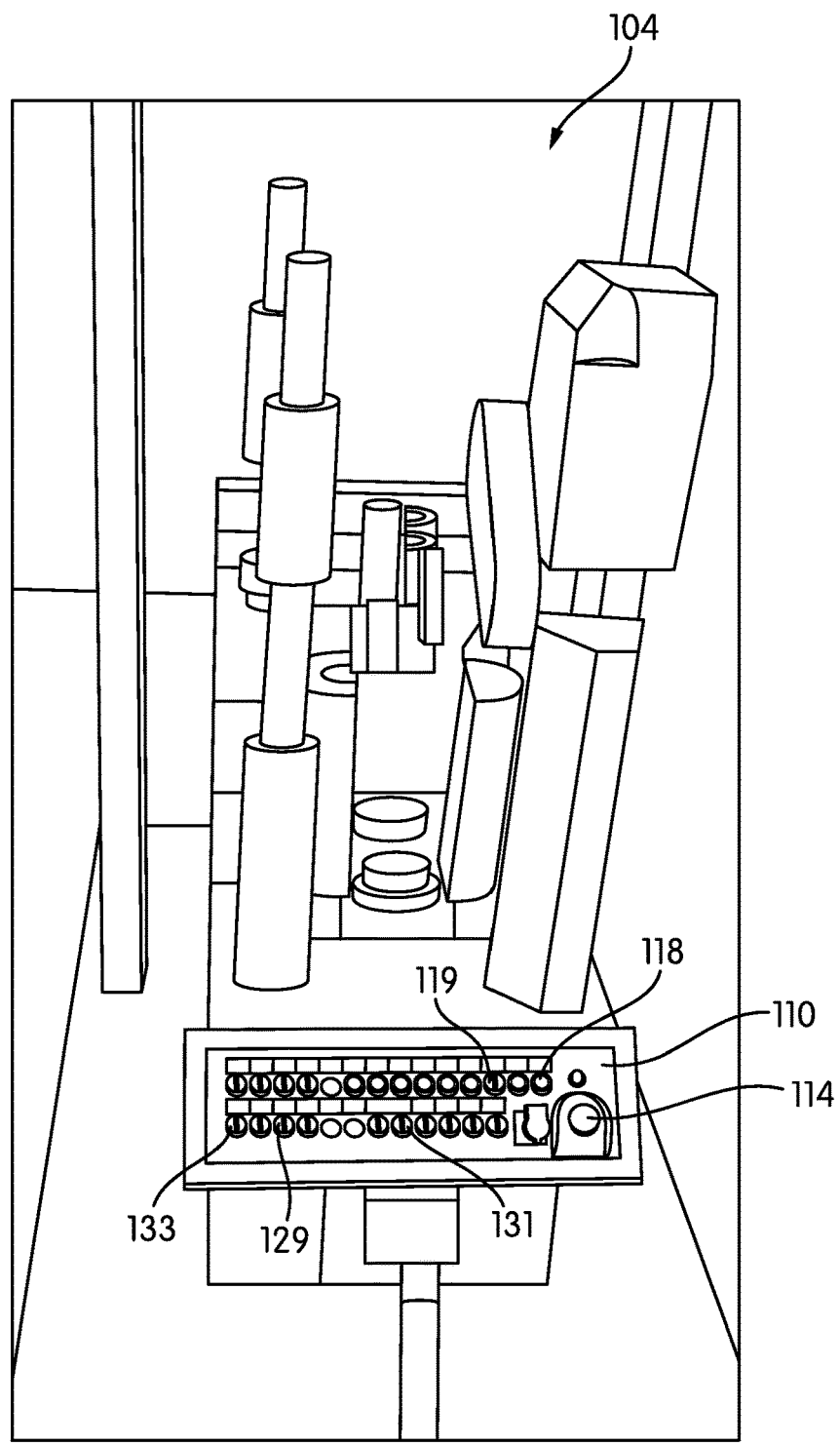
FIG. 3 is a view of a blow station of the section of the I.S. machine of FIG. 1 shown schematically according to an exemplary embodiment.

With reference to FIG. 3, an embodiment of a blow station 104 is illustrated. The blow station 104 includes an operator interface, shown as blow station control panel 110, configured to receive input from an operator to control movement and/or adjustment of mechanisms of the blow station 104, e.g., glass container-forming mechanisms, servo mechanisms, pneumatic mechanisms, mold halves, blow head, takeout mechanism, etc.

In one embodiment, the blow station control panel 110 includes a plurality of buttons and/or switches that may be actuated by an operator to provide input to a control unit configured to control movement of the mechanisms of the section 100. The blow station control panel 110 includes a maintenance mode initiator, shown as maintenance mode button 114. When the maintenance mode button 114 is actuated, the control unit is configured to not provide power to, e.g., remove power from, all of the mechanisms of the blank station 102, the blow station 104, and the invert mechanism 106. The blow station control panel 110 also includes a setup mode initiator, shown as setup mode button 119.

In one embodiment, upon actuation of the setup mode button 119, the control unit is configured to transition the section 100 between a first mode of operation (e.g., a mode in which the section is making glass containers, not setup mode, etc.) and a third mode of operation in which power is provided to the mechanisms of the blow station 104 and the invert mechanism 106 and power is not provided to, e.g., power is cut off from, the mechanisms of the blank station 102. The blow station control panel 110 also includes a first operator input mechanism, shown as enable button 118, and a second operator input mechanism, shown as a plurality of movement adjust switches and/or buttons 129, 131, 133, each configured to adjust movement, e.g., location adjustment, etc., of a different blow station 104 mechanism (e.g., servo mechanism, pneumatic mechanism, etc.) (other movement adjustment switches and/or buttons configured to adjustment movement, e.g., location adjustment, etc., of other blow station 104 mechanisms are shown without reference numbers).

In one embodiment, the control unit is configured to continue to provide power to the mechanisms of the blow station 104 when the enable button 118 is actuated, while continuing to maintain the blank station 102 disconnected from power, e.g., continue not to supply power to the blank station 102, when the enable button 118 is actuated.

In one embodiment, the enable button 118 is biased toward a first, unactuated configuration, e.g., once the operator stops pressing the enable button 118, it returns to the first configuration. The operator, while actuating, e.g., pressing, the enable button 118, may actuate one of the movement adjustment switches and/or buttons 129, 131, 133, e.g., with one hand pressing the enable button 118 and the other hand pressing the movement adjustment switch and/or button, to move, adjust, configure, jog, etc., the mechanism associated with the actuated movement adjustment switch and/or button. Thus, this two-handed control, may prevent an operator from reaching into the blow station 104 while mechanisms of the blow station 104 are being moved.

In one embodiment, the movement adjustment switches and/or buttons 129, 131, 133, cannot be actuated unless the enable button 118 is also being actuated. In another embodiment, actuation of the movement adjustment switches and/or buttons 129, 131, 133, while the enable button 116 is not also actuated will not cause movement of the mechanism controlled by the actuated movement adjustment switch and/or button.

In one embodiment, the movement adjustment switch and/or button 129 is configured to control movement of the blowhead. Inn one embodiment, the movement adjustment switch and/or button 131 is configured to control movement of the takeout mechanism. In one embodiment, the movement adjustment switch and/or button 133 is configured to control movement of the blow molds, e.g., blow mold halves.

In one embodiment, the control unit also includes a speed supervision controller. In one embodiment, it is the same speed supervision controller as described above. In another embodiment, another speed supervision controller may be used. When the setup mode button 119 is actuated and the section 100 is in the third setup mode, the speed supervision controller is configured to monitor and/or control the speed of movement of the invert mechanism 106. If the speed of movement of the invert mechanism exceeds a predetermined speed, the speed supervision controller is configured to stop movement of the invert mechanism 106 and/or to stop supplying power to the invert mechanism 106, e.g., disconnect power from the invert mechanism 106.

In another embodiment, when the setup mode button 119 is actuated, power is not supplied to mechanisms of either the blank station 102 or the blow station 104, e.g., the mechanisms of both stations 102 and 104 are disconnected from power. Then, when the enable button 118 is actuated, power is supplied to the blow station 104, and when a movement adjustment switch and/or button is actuated while the enable button 118 is actuated, the mechanism controlled by the selected movement adjustment switch and/or button is moved. In one embodiment, the enable button 118 is biased toward a first, unactuated configuration, and, thus, power is only provided to the blow station 104 mechanisms in setup mode while the operator continues to press the enable button 118.

Figure 4:
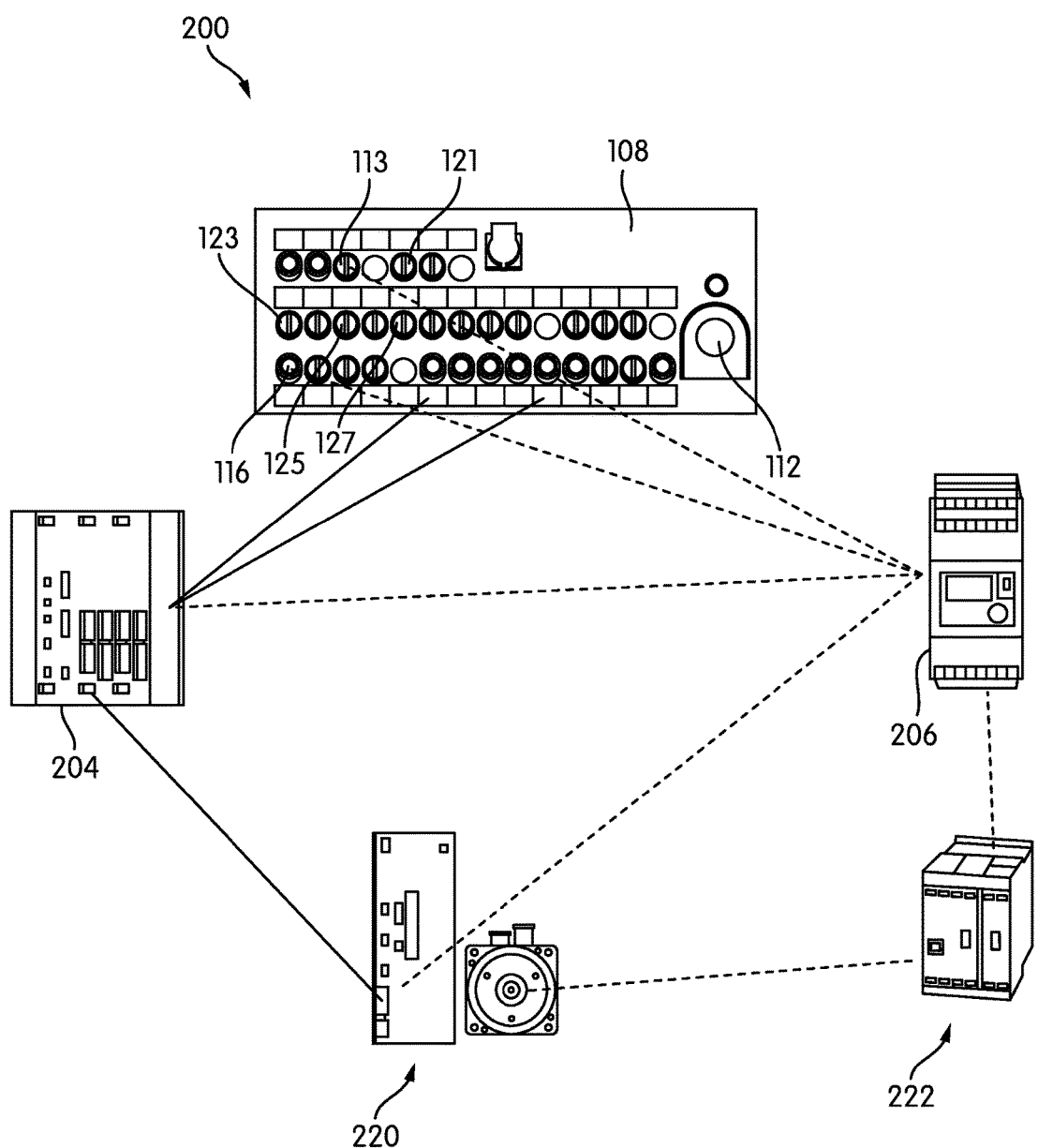
FIG. 4 is a schematic diagram illustrating components of a control unit of a section of an I.S. machine according to an exemplary embodiment.

With reference to FIG. 4, an embodiment of a control unit 200 configured to control a section of an I.S. machine is illustrated. The control unit 200 includes a blank station control panel 108. Additionally, the control unit 200 includes a blow station control panel (not illustrated in FIG. 4). The control unit 200 also includes a controller 204. The controller 204 is configured to control movement of the mechanisms of the blank station during an operating mode of operation, e.g., making glass containers, not in setup mode, etc. The control unit 200 also includes a second controller, shown as setup mode controller 206. The setup mode controller 206 is configured to control the mechanisms of the blank station and/or the controller 204 when the setup mode button 113 of the control panel 108 is actuated. The controller 204 and the setup mode controller 206 are coupled with and/or in communication with and/or configured to receive input from each other and from the control panel 108. When an operator actuates the setup mode button 113, the setup mode controller 206 is configured to control the controller 204 and drive 220 to not provide power to, e.g., disconnect from power, all of the mechanisms of the blow station and to only provide power to the mechanisms of the blank station and to the invert mechanism. When the enable button 216 is actuated by an operator, the operator may actuate one of the movement adjustment switches and/or buttons 121, 123, 125, 127, to move one of the mechanisms of the blank station. When the enable button 216 and one of the movement adjustment switches and/or buttons 121, 123, 125, 127 are actuated, the setup mode controller 206 controls the controller 204 to move the mechanism of the blank station associated with the actuated movement adjustment switch and/or button.

In one embodiment, a blow station control panel is provided. The blow station control panel is also coupled to, e.g., in communication with the controller 204 and setup mode controller 206, and configured for movement of mechanisms of the blow station with no power being provided to the blank station when the blow station is in setup mode as described above. When an operator actuates the setup mode button of the blow station, the setup mode controller 206 is configured to control the controller 204 and the drive 220 to not provide power to, e.g., disconnect from power, all of the mechanisms of the blank station and to only provide power to the mechanisms of the blow station and to the invert mechanism. When the enable button of the blow station control panel is actuated by an operator, the operator may actuate one of the movement adjustment switches and/or buttons to move one of the mechanisms of the blow station. When the enable button of the blow station control panel and one of the movement adjustment switches and/or buttons are actuated, the setup mode controller 206 controls the controller 204 to move the mechanism of the blow station associated with the actuated movement adjustment switch and/or button.

With further reference to FIG. 4, in one embodiment, the controller 204 and the setup mode controller 206 are each coupled to, e.g., in communication with, a drive mechanism 220 configured to drive, e.g., move, the mechanisms of the blank station as directed by the controller 204 and/or the setup mode controller 206. The control unit 200 also includes a speed controller 222. The speed controller 222 is coupled to, e.g., in communication with, the drive mechanism 220 and the setup mode controller 206. In one embodiment, the speed controller 222 is configured to monitor the speed of the invert mechanism 106 when the blank station and/or the blow station is in setup mode. If the speed of the invert mechanism 106 exceeds a predetermined speed, the speed controller 222 is configured to stop movement of the invert mechanism 106, e.g., remove power from the invert mechanism 106.

In one embodiment, when the setup mode button 212 is actuated, when the blank station and/or the blow station is in setup mode, and/or when one of the enable buttons and a movement adjustment switch and/or button are actuated simultaneously, the speed controller 222 is configured to monitor the speed of the movement of the moving mechanism. If the speed of movement exceeds a predetermined speed during setup mode, the speed controller 222 is configured to stop movement of the mechanism, e.g., disconnect power from the mechanism, etc. In one embodiment, the predetermined speed may be a different predetermined speed for different mechanisms.

In one embodiment, the setup mode controller 206 is a programmable logic controller (PLC), e.g., a PLC programmed and configured to control a section of an I.S. machine as discussed above. In other embodiments, other suitable controllers may be used. In various embodiments, safety PLCs may be used. In one embodiment, the PLC may include a safety relay such as, for example, a PNOZ mm0p, commercially available from Pilz GmbH & Co. KG. In one embodiment, the PLC and/or module may have the following approvals: CE, cULus Listed, TUV, BG, CCC, and KCC.

Figure 5:
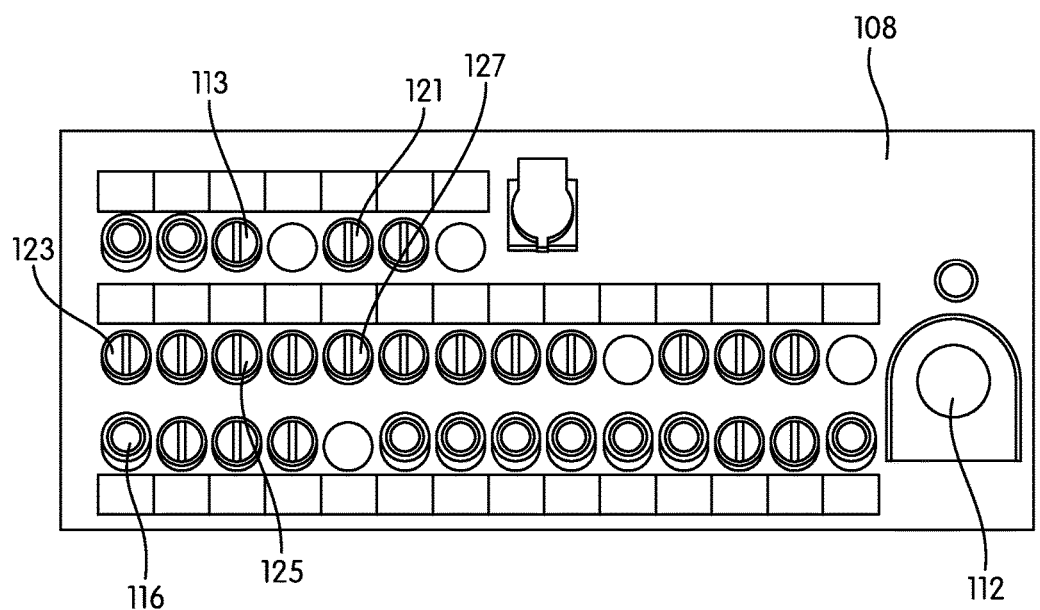
FIG. 5 is a view of the control panel of the blank station of FIG. 2 according to an exemplary embodiment.

With reference to FIG. 5, the blank station control panel 108 is illustrated according to an exemplary embodiment. As discussed above, the blank station control panel 108 includes a setup mode button 113 actuatable between a first configuration and a second configuration, in which power is not supplied to the mechanisms of the blow station and power is supplied to the mechanisms of the blank station and to the invert mechanism. In one embodiment, the setup mode button 113 is configured to remain in either the first configuration or the second configuration until an operator actuates the button to the other configuration. With the setup mode button 113 in the second configuration, the enable button 116 may be actuated. With an operator continuing to actuate, e.g., press, the enable button 116, the operator may actuate one of the movement adjustment switch and/or buttons 121, 123, 125, 127, to move the mechanism of the blank station corresponding to the actuated movement adjustment switch and/or button. Thus, an operator may move, adjust, configure, jog, etc., the mechanism associated with the actuated movement adjustment switch and/or button to adjust and/or configure the mechanism of the blank station. Thus, this two-handed control, may prevent an operator from reaching into the blank station 102 while mechanisms of the blank station 102 are being moved. Additionally, because power is not provided to any of the mechanisms of the blow station during the blank station setup, an operator at the blow station will not encounter movement of any of the mechanisms of the blow station during the blank station setup.

Figure 6:
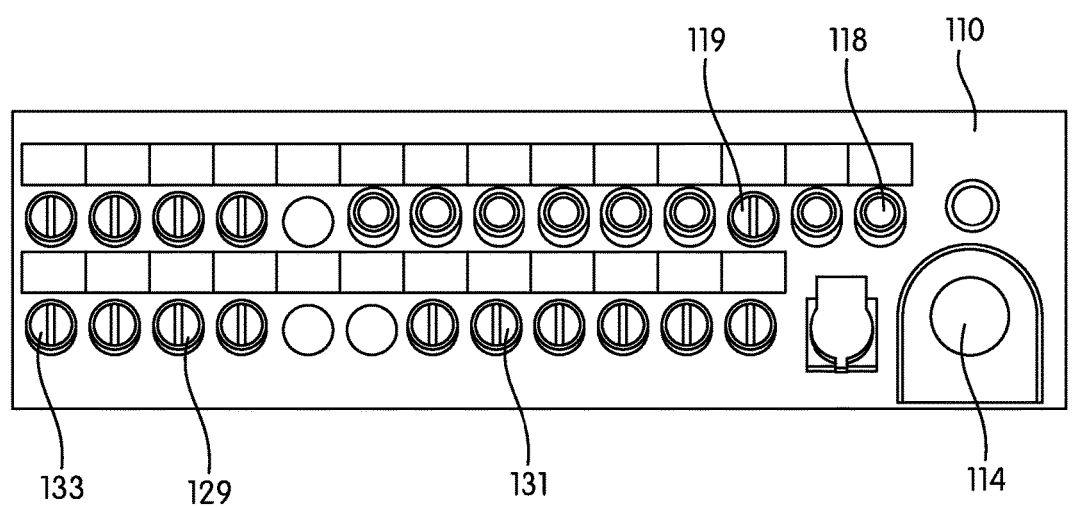
FIG. 6 is a view of the control panel of the blow station of FIG. 3 according to an exemplary embodiment.

With reference to FIG. 6, the blow station control panel 110 is illustrated according to an exemplary embodiment. As discussed above, the blow station control panel 110 includes a setup mode button 119 actuatable between a first configuration and a second configuration in which power is not supplied to the mechanisms of the blank station but power is supplied to the mechanisms of the blow station and to the invert mechanism. In one embodiment, the setup mode button 119 is configured to remain in either the first configuration or the second configuration until an operator actuates the setup mode button 119 to the other configuration. With the setup mode button 119 in the second configuration, the enable button 118 may be actuated. With an operator continuing to press the enable button 118, the operator may actuate one of the movement adjustment switches and/or buttons 129, 131, 133 to move the mechanism of the blow station corresponding to the actuated movement adjustment switch and/or button. Thus, an operator may move, adjust, configure, jog, etc., the mechanism associated with the actuated movement adjustment switch and/or button to adjust and/or configure the mechanism of the blow station. Thus, this two-handed control, may prevent an operator from reaching into the blow station 104 while mechanisms of the blow station 104 are being moved. Additionally, because power is not provided to any of the mechanisms of the blank station during the blow station setup, an operator at the blank station will not encounter movement of any of the mechanisms of the blank station during the blow station setup.

While the buttons and switches described herein are shown as physical buttons having a first configuration and a second configuration, in other embodiments, other suitable mechanisms, e.g., electrical operator input mechanisms, switches, touchpads, touchscreens, or other appropriate actuators may be used.

Figure 7:
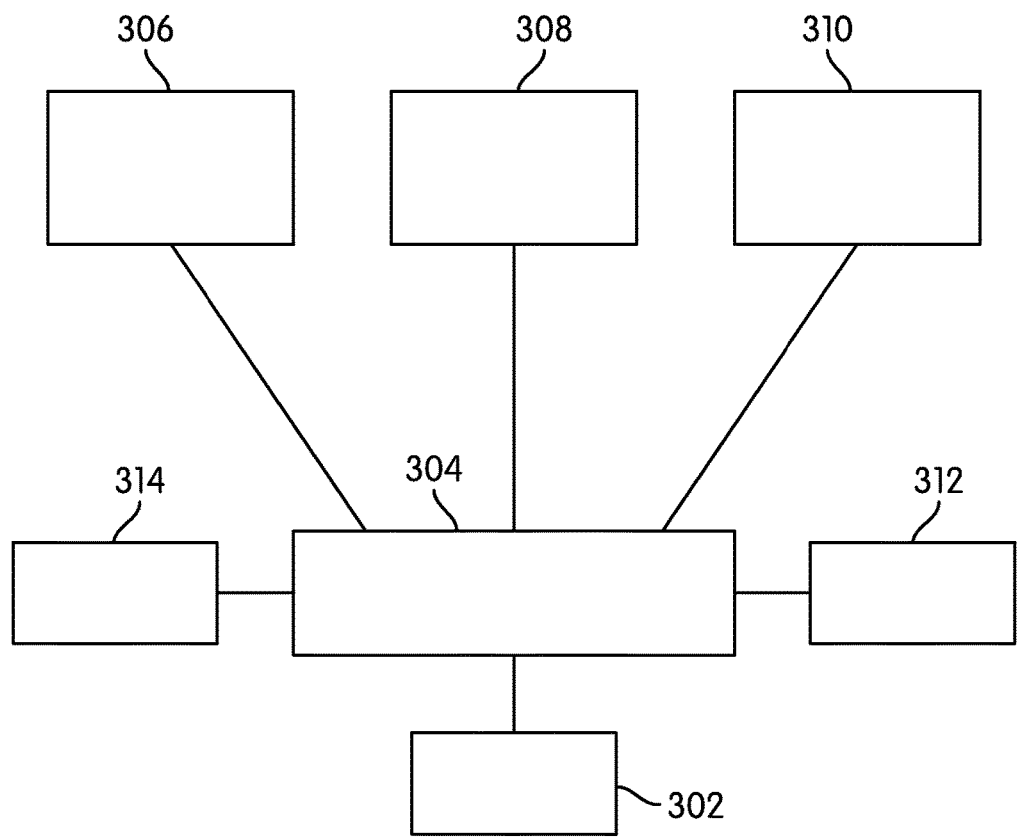
FIG. 7 is a block diagram illustrating a configuration of a station of an I.S. machine according to an exemplary embodiment.

With reference to FIG. 7, a block diagram illustrating a configuration of a station of an I.S. machine according to an exemplary embodiment. A power source 302 such as, e.g., a 400V power supply to the drives or 24V power supply to controller outputs, etc. is provided. The power source 302 is configured to output power to a blank station 306, an invert mechanism 308, and a blow station 310. A control unit 304 is provided. The control unit 304 is configured to regulate power flow to the blank station 306, the invert mechanism 308, and the blow station 310. The control unit 304 is configured to receive input from an operator through a blank station control panel 312. When an operator provides input through the control panel 312 directing the station to enter a setup mode, e.g., a blank station setup mode, the control unit 304 is configured to allow power flow to the blank station 306 and the invert mechanism 308, but to stop flow of power to the blow station 310. The control unit 304 is also configured to receive input from an operator through a blow station control panel 314. When an operator provides input through the control panel 314 directing the station to enter a setup mode, e.g., a blow station setup mode, the control unit 304 is configured to allow power flow to the blow station 310 and the invert mechanism 308, but to stop flow of power to the blank station 306.

In one embodiment, control units, controllers, and/or methods described herein may be implemented in software.

In another embodiment, control units, controllers, and/or methods described herein may be implemented in a combination of computer hardware and software. In various embodiments, systems implementing the control units and/or controllers discussed herein include one or more processing components, one or more computer memory components, and one or more communication components. In various embodiments, the processing components may include a general purpose processor, an application specific processor (ASIC), a circuit containing one or more processing components, a group of distributed processing components, a group of distributed computers configured for processing, etc., configured to provide the functionality of the evaluation tools discussed herein. In various embodiments, memory components may include one or more devices for storing data and/or computer code for completing and/or facilitating the various processes described in the present disclosure, and may include database components, object code components, script components, and/or any other type of information structure for supporting the various activities described in the present disclosure. In various embodiments, the communication components may include hardware and software for communicating data for the system and methods discussed herein. For example, communication components may include, wires, jacks, interfaces, wireless communications hardware etc., for receiving and transmitting information as discussed herein. In various specific embodiments, the tools and/or systems and/or methods described herein, may be embodiment in non-transitory, computer readable media, including instructions (e.g., computer coded) for providing the various functions and performing the various steps discussed herein. In various embodiments, the computer code may include object code, program code, compiled code, script code, executable code, instructions, programmed instructions, non-transitory programmed instructions, or any combination thereof. In other embodiments, control units and/or controllers described herein may be implemented by any other suitable method or mechanism.

Certain terminology is used herein for convenience only and is not to be taken as a limitation on the present invention. Relative language used herein is best understood with reference to the drawings, in which like numerals are used to identify like or similar items.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present invention.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A control unit configured to control a section of an I.S. machine having a blank station for forming a parison including a first plurality of mechanisms and a blow station for blowing the parison into glass containers including a second plurality of mechanisms, the control unit comprising:
   an operator interface configured to receive a first input and a second input from an operator; and
   a controller configured to transition the section from a first mode of operation to a second mode of operation upon receipt of the first input, wherein the first mode of operation is a glass container making mode of operation in which glass containers are made in the section using the first plurality of mechanisms and second plurality of mechanisms and the second mode of operation is a setup mode of operation in which adjustments to the section can be made;
   wherein upon receipt of the first input, the control unit is configured to supply power to either the first plurality of mechanisms or the second plurality of mechanisms and to cut off power to the other plurality of mechanisms; and
   wherein the controller is configured to move one of the plurality of mechanisms to which power is being supplied in the second mode of operation based on the second input received from the operator.

2. The control unit of claim 1, wherein:
when the controller supplies power to the blank station upon receipt of the first input, the controller cuts off power to the blow station; and
when the controller supplies power to the blow station upon receipt of the first input, the controller cuts off power to the blank station.

3. An I.S. machine configured to form glass containers comprising:
a blank station including a first plurality of mechanisms configured to form glass gobs into parisons;
a blow station including a second plurality of mechanisms configured to form the parisons into the glass containers;
an invert mechanism configured to move the parisons from the blank station to the blow station; and
a controller configured to receive a first input from an operator through an operator interface, the controller configured to operate the blank station, the blow station, and the invert mechanism to form glass containers;
wherein the controller is configured to transition from a glass container making mode to a setup mode by providing power to either the blank station or the blow station and to cut off power to the other station upon receipt of the input from the operator.

4. The I.S. machine of claim 3, comprising a second operator interface, wherein when the controller receives the first input from the operator interface, the controller is configured to transition from a glass container making mode to a setup mode for the blank station by supplying power to the blank station and to cut off power to the blow station; and
wherein when the controller receives a first input from the second operator interface, the controller is configured to transition from a glass container making mode to a setup mode for the blow station by supplying power to the blow station and to cut off power to the blank station.

5. The I.S. machine of claim 4, wherein the second operator interface includes a first operator input mechanism actuatable from a first configuration to a second configuration and a plurality of second operator input mechanisms each actuatable from a first configuration to a second configuration;
wherein when one of the plurality of second operator input mechanisms is actuated to the second configuration while the first operator input mechanism is in the second configuration, the controller is configured to move one of the second plurality of mechanisms based on which one of the plurality of second operator input mechanisms is actuated.

6. The I.S. machine of claim 3, wherein the operator interface includes a first operator input mechanism actuatable from a first configuration to a second configuration and a plurality of second operator input mechanisms each actuatable from a first configuration to a second configuration;
wherein when one of the plurality of second operator input mechanisms is actuated to the second configuration while the first operator input mechanism is in the second configuration, the controller is configured to move one of the first plurality of mechanisms based on which one of the plurality of second operator input mechanisms is actuated.

7. The I.S. machine of claim 6, wherein the first operator input mechanism is biased toward the first configuration.

8. An apparatus for controlling a section of an I.S. machine having a blank station including a first plurality of mechanisms and a blow station including a second plurality of mechanisms, the apparatus comprising:
a control unit configured to transition between a first mode of operation and a second mode of operation;
when in the first mode of operation, power may be supplied to the first plurality of mechanisms and the second plurality of mechanism and both the first and second plurality of mechanisms are capable of movement, when in the second mode of operation power is supplied to only one of the first or second plurality of mechanisms and power is cutoff from the other one of the first or second plurality of mechanisms such that only the one of the plurality of first or second plurality of mechanisms supplied power is capable of movement while the other one of the first or second plurality of mechanisms are prevented from moving.

9. A control unit configured to control a section of an I.S. machine having a blank station including a first plurality of mechanisms and a blow station including a second plurality of mechanisms, the control unit comprising:
an operator interface configured to receive a first input and a second input from an operator; and
a controller configured to transition the section from a first mode of operation to a second mode of operation upon receipt of the first input;
wherein upon receipt of the first input, the control unit is configured to supply power to either the first plurality of mechanisms or the second plurality of mechanisms and to not supply power to the other plurality of mechanisms;
wherein the controller is configured to move one of the plurality of mechanisms to which power is being supplied in the second mode of operation based on the second input received from the operator;
wherein the operator interface includes a second mode initiator configured to be actuated by the operator to direct the controller to transition the section from the first mode of operation to the second mode of operation;
wherein the operator interface includes a first operator input mechanism actuatable between a first configuration and a second configuration and a second operator input mechanism actuatable between a first configuration and a second configuration; and
wherein upon actuation of the second operator input mechanism to the second configuration while the first operator input mechanism is in the second configuration while the section is in the second mode of operation, the controller is configured to move one of the plurality of mechanisms to which power is being supplied.

10. The control unit of claim 9, further comprising a second operator interface configured to receive a third input from the operator;
wherein upon receipt of the first input from the operator through the operator interface, the controller is configured to supply power to the first plurality of mechanisms and not to supply power to the second plurality of mechanisms; and
wherein upon receipt of the third input from the operator through the second operator interface, the controller is configured to supply power to the second plurality of mechanisms and not to supply power to the first plurality of mechanisms.

11. The control unit of claim 10, wherein the operator interface includes a first operator input mechanism actuatable between a first configuration and a second configuration and a second operator input mechanism actuatable between a first configuration and a second configuration; and
  wherein, when in the second mode of operation, the controller is configured to move one of the first plurality of mechanisms upon actuation of the second operator input mechanism of the operator interface to the second configuration only if the first operator input mechanism of the operator interface is in the second configuration;
  wherein the second operator interface includes a third mode initiator configured to be actuated by the operator to direct the controller to transition the section from the first mode of operation to the third mode of operation;
  wherein the second operator interface includes a first operator input mechanism actuatable between a first configuration and a second configuration and a second operator input mechanism actuatable between a first configuration and a second configuration; and
  wherein, when in the third mode of operation, the controller is configured to move one of the second plurality of mechanisms upon actuation of the second operator input mechanism of the second operator interface to the second configuration only if first operator input mechanism of the second operator interface is in the second configuration.

12. The control unit of claim 11, wherein the first plurality of mechanisms include blank mold halves; and wherein the second plurality of mechanisms include blow mold halves.

13. The control unit of claim 11, wherein the first plurality of mechanisms include at least one of a blank mold, a baffle mechanism, and a funnel mechanism.

14. The control unit of claim 13, wherein the second plurality of mechanisms include at least one of a blow mold, a blow head, and a takeout mechanism.

15. The control unit of claim 11, wherein the first operator input mechanism of the second operator interface is biased toward the first configuration.

16. The control unit of claim 9,
  wherein the controller is configured to move one of the plurality of mechanisms to which power is being supplied power upon actuation of the second operator input mechanism to the second configuration only if the first operator input mechanism is in the second configuration.

17. The control unit of claim 16, wherein the first operator input mechanism is biased toward the first configuration.

18. The control unit of claim 9, wherein the controller is a programmable logic controller.

19. The control unit of claim 9, wherein the first operator input mechanism and second operator input mechanism are configured for two-handed control such that the operator must use both hands to actuate the first and second operator input mechanisms to the second configurations to move one of the plurality of mechanisms to which power is being supplied in the second mode of operation.

* * * * *